T. Brown.
Cable Stopper.
No. 664. Reissued Feb. 15, 1859.
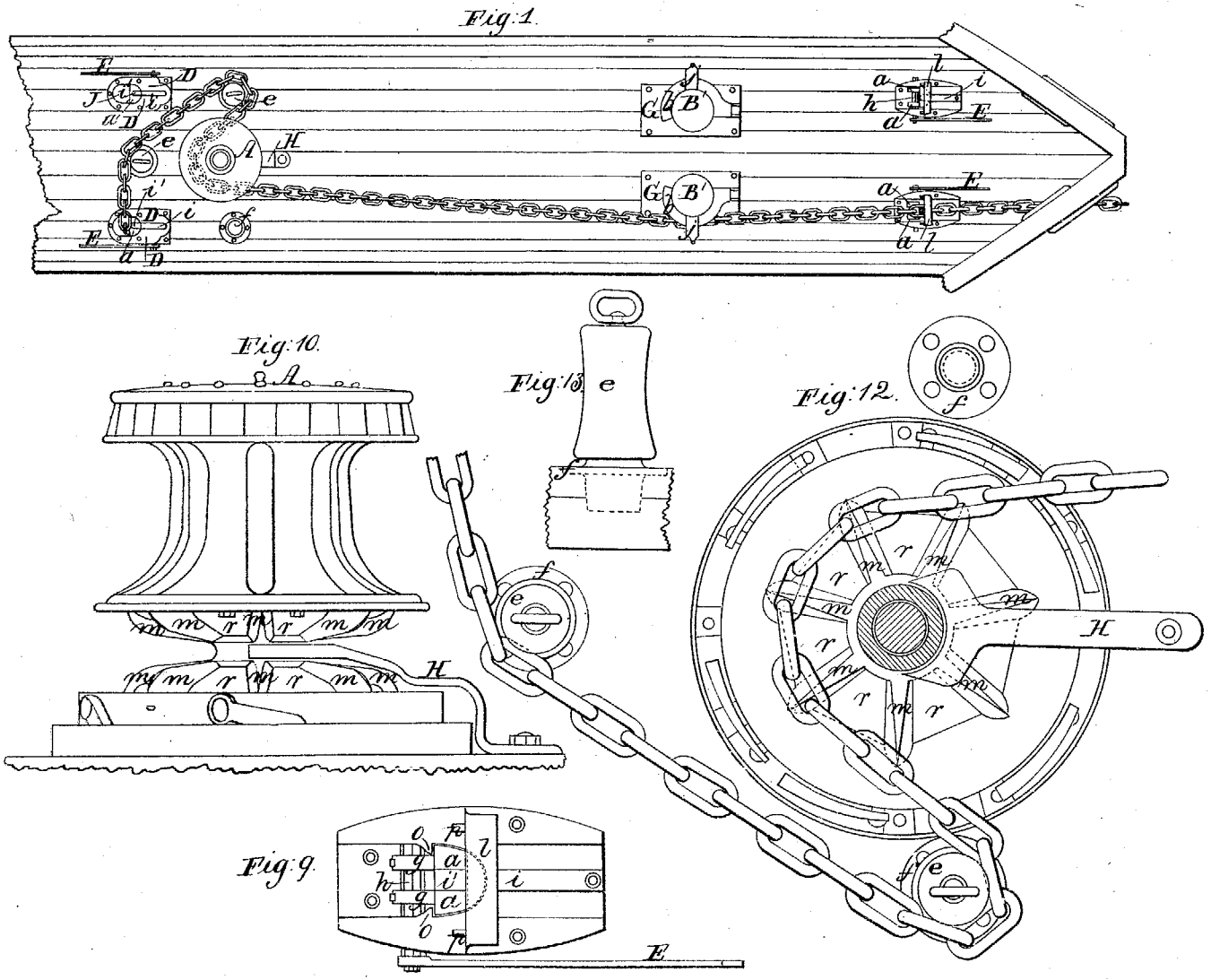
N. PETERS, PHOTO-LITHOGRAPHER, WASHINGTON, D. C.

Sheet 2, 2 Sheets.
T. Brown.
Cable Stopper.
No. 664. Reissued Feb. 15, 1859.
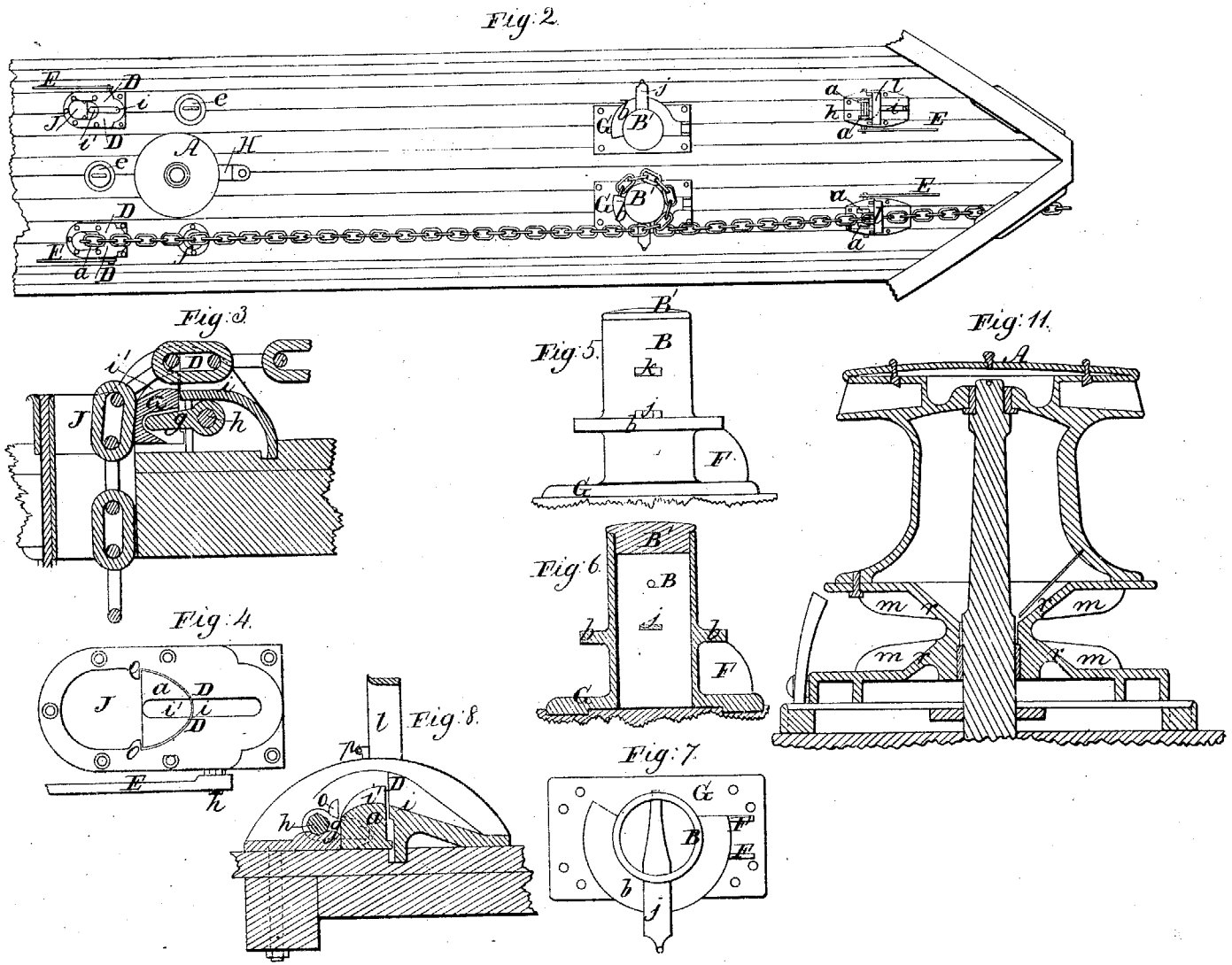
N. PETERS, PHOTO-LITHOGRAPHER, WASHINGTON, D. C.

UNITED STATES PATENT OFFICE.

THOMAS BROWN, OF LONDON, ENGLAND.

IMPROVED ARRANGEMENT OF MEANS FOR WORKING AND STOPPING CHAIN CABLES.

Specification forming part of Letters Patent No. 11,404, dated July 25, 1854; Reissue No. 364, dated March 25, 1856; Reissue No. 664, dated February 15, 1859.

*To all whom it may concern:*

Be it known that I, THOMAS BROWN, of London, in the United Kingdom of Great Britain and Ireland, have invented certain new and useful Improvements in Apparatus for Working and Stopping Chain Cables; and I do hereby declare that the following is a full, clear, and exact description thereof, reference being made to the annexed drawings, forming part of this specification, and in which—

Figure I is a plan or top view of a portion of the deck of a vessel having my apparatus attached, and exhibiting it as in the act of hauling in a chain cable and delivering the same into the chain-locker. Fig. II is a like plan, but representing the cable as in the act of running out. Figs. III to XIII, inclusive, are of parts in detail, fully described herein.

Similar letters indicate similar parts in all the figures.

The nature of the first part of my invention consists in so constructing a capstan or windlass that it shall be capable of "handling" chain cables of several different sizes when taking only a partial turn around said capstan.

The nature of the second part of my invention consists in the combination, with a capstan or windlass which is capable of working a chain cable when only a partial turn is taken, of a set of removable rollers so arranged in relation to the deck-pipes, riding-bits, and hawse-holes that when the chain is to run out it can be permitted to do so without interfering with the capstan, and without requiring to be overhauled, while when said cable is to be hauled in they shall form the means whereby the partial turn around the capstan requisite for the working of the same can be taken and maintained.

The nature of the third part of my invention consists in an improved method of giving more cable to a ship riding at anchor by a chain cable, whereby the chain may be given, if need be, link by link.

It will be seen that a prominent feature of my improvements is the ability to "handle" chain cables of different sizes without requiring that the cable should be wound around the body of the capstan or windlass a sufficient number of times to get the necessary friction whereby the hauling in might be effected.

Previous to the date of my invention no method had been devised by which this could be accomplished, although capstans and hoisting apparatus had often been employed which were so constructed that by each of them one chain of given size could be worked although only a partial turn were taken about the capstan.

The construction and operation will be as follows:

The capstan, except in that part which is to handle the chain, is generally as of the usual make, and as shown at A, Figs. X and XI. There is, however, a peculiar groove or annular recess around the said capstan, whereby the cables of different sizes are to be worked the same as when only a partial turn is taken thereon. This recess or groove has its upper and lower sides inclined to each other, so as to flare apart, as seen at *r* in the said figures. It has also a series of ribs cast radially upon these inclined surfaces and extending outward a little beyond the terminal edges of said surfaces, as seen at *m* in Figs. X, XI, XII. The ribs on each of the sides are placed so as to stand directly opposite to those on the other, and are equidistant, as shown. The tops of these ribs are also inclined to each other, so that the space at the outer ends between opposite ribs on the two inclined sides of the groove is greater than at the inner portion, this space diminishing gradually, as seen in Figs. X and XI.

It will now be seen how I am enabled to handle various-sized chains by means of my said improvement.

In Fig. XII is a horizontal section through the center of the grooved flange, exhibiting a chain cable lying therein in the position it has when being raised or hauled in—*i. e.*, having a partial turn about the same. The cable shown represents one of the largest size proper to be taken in by a capstan of a given capacity. Each alternate link of the cable is seen to stand at a right angle to the other. Those links lying horizontally are caught between the radial ribs *m*, and they move along toward the center until those links which stand vertically are caught by the sides of the groove-plates *r*. The chain is thus prevented from slipping in the groove, because the after end of each of the vertical links is caught by the projecting ribs *m*, and, as the capstan is made to revolve, the radial ribs constantly engage each alternate link as they come along and as fast as links are released upon the opposite side, whereby the chain is made to progress past the capstan. When chains of other sizes are required to be worked, it will be seen that such will adapt themselves at once to the shape of the radially-ribbed groove. The links, for instance, of a less-sized chain cable than that shown in the drawings will sink deeper into the groove, and until its vertical links are arrested by the flaring sides *v* of the flange. As the links are shorter in such a chain, so it will be seen that the distance from one rib to the next is less as they recede within the cavity, and thus these ribs will engage each alternate link, as before described, and so of any other sized chain cable. This form of flange also accommodates itself to any irregularities there may be in the links of any particular cable, due to imperfect workmanship, as well as to any shackles there may be in the chain, upon the same principle that it is enabled to work different-sized chains, the different-sized links or shackles sinking in according to said size.

In Figs. I and II is represented the arrangement of the capstan, movable rollers, and deck-pipes for working a chain cable without being required to overhaul the same. Each deck-pipe J is placed over a locker and in a direct line aft from the hawse-hole on that side, as will be seen from the line of chain in Fig. II. Between those deck-pipes, triangularly placed, stands the capstan A. On each side of the capstan is secured to the deck a socket-plate, *f*, fitted to receive the foot of one of the removable rollers. There is also a third socket placed between the deck-pipes and abaft of the capstan, as seen in Figs. I and II, with a removable roller, *e*, in place therein. These rollers are strong castings, shaped as seen at *e*, Fig. XIII, (which is a side view,) and having a pivot-pin on its base which fits in either of the socket-plates *f*.

In Fig. I the chain cable is shown in position for heaving up anchor. A partial turn is taken about the capstan in the annular groove *r m;* thence it is passed around the roller *e* on the port side, and around the roller abaft the capstan, then through the deck pipe whence it falls into its appropriate locker in tiers. When the port-chain is to be worked, the roller *e* on that side of the capstan must be changed to the socket *f* on the starboard side, and the turn of the chain is then taken from the opposite side to that above described. There is a clearing-guide, H, firmly secured to the deck just forward of the base of the capstan, the upper end of which extends into the groove around the capstan, as seen in Figs. X and XII. At this part the guide should be forked, in order to extend farther around the bottom of the groove, its purpose being to prevent the cable from being carried around to the receiving side, which, but for this, might occur by reason of a link getting jammed occasionally between the flanges, and so be carried on. In paying out, the cable is to be disengaged from the rollers *e*, and thus is also freed from the capstan, a turn being, of course, taken around the riding-bit, as usual, and then the cable will run out in a straight line from the deck-pipe to the hawse-hole, as seen in Fig. II.

The safely letting out of chain when the ship riding at anchor requires more way is effected by means of two stoppers so constructed and placed in the line of travel of the chain as to arrest the same at any link, and also disengage it link by link. These stoppers are shown in Figs. III, IV, and VIII, IX. The latter are two views, one, Fig. VIII, in section, and the other, Fig. IX, from the top of the forward or bow stopper, and Figs. III and IV are like views of the after stopper. Both the bow stoppers and the after stoppers are arranged with under lifters, *a*, and levers E in such manner that when the lifters are down the cable as it is hove in will be stopped at every flat link, and when said lifters are elevated the cable is allowed to run freely over the stoppers.

Figs. VIII and IX show the form and arrangement of the bow stopper. The body of the stopper which is secured to the deck has a groove, *i*, formed in the center of a recess in the inclined forward portion thereof, which leads up to the forward side of a vertical aperture that receives the lifter *a*. The lifter *a* has a rear wardly-inclined groove, *i'*, in it, which corresponds with the groove *i* in the recess in the forward portion of the body of the stopper. The front side of the lifter *a* and of the aperture that it works in is curved, as shown in the drawings. Consequently it will be perceived that when the lifter is allowed to descend into the position shown in Fig. VIII a recess will be formed in the rear of the shoulders D D, on each side of the groove *i*, which will receive every flat link as the cable is hove in, and will stop the cable should there be any cessation in heaving it in. When a cable is to be run out, the lifter *a* of the bow stopper and also the lifter of the after stopper are elevated, so that the tops of the sides of their grooves *i'* are even with the upper portions of the shoulders D D in the bodies of the stoppers, which will enable the cable to run freely over them. To arrest the running out of the cable and bring a vessel to anchor, it is only necessary to allow the lifter *a* in the after stopper to descend into the position shown in Fig. III. The lifter *a* in the bow stopper is operated by means of the lever E, which is connected to the shaft *h*, and the cams or levers *g g*, which project from *h* and fit into a recess in the rear side of said lifter, as shown in Fig. VIII. The lifters in the after stoppers are operated in the same manner as the lifters in the bow stoppers, save that the cams or short levers *g g* fit into recesses in the forward side of said lifters, as shown in Fig. III.

It will be perceived that the vessel itself hauls the cable out of its locker without any previous overhauling, and that one man stationed at the after stopper can at any moment stop the cable and bring the vessel to anchor by simply letting down the lifter *a* of the after stopper.

When a vessel is riding heavily at anchor, and it is desired to give her more cable, it can be accomplished without the slightest danger of starting the anchor by manning the bow and after stoppers and by word of command causing their levers E to be alternately elevated and depressed, which will cause the cable to be let out in the following manner, viz: When the lever of the after stopper is elevated, the weight of the cable between the stoppers will depress it, and thereby draw a couple of links over the lifter of the after stopper, and when said lever descends the next flat link in succession will be arrested. When the lever of the bow stopper is elevated, the weight of the cable outside the vessel will draw the cable taut between the stoppers, and thus, little by little and with perfect safety, any amount of cable can be given to a vessel, however heavily she may be riding at anchor. The after part of the body of the after stopper may be cast of such shape as to form the mouth J of the chain-locker deck-pipe, as shown in Figs. III and IV. The capstan is placed in such position in relation to the deck-pipes J that the cable can deliver itself directly into its appropriate locker from whichever hawse-hole it may be hove in, as shown in Fig. I.

I claim—

1. The flaring and radially-flanged annular recess in the capstan for working a cable of any given size or cables of several different sizes, the same being constructed and operating in the manner and for the purposes substantially as set forth herein.

2. In combination with a capstan or windlass which is capable of working a chain cable when only a partial turn is taken, a set of removable rollers so arranged in relation to the capstan, the deck-pipes, and hawse-holes that either a port or starboard chain cable can be continuously hove in by means of said capstan and rollers, or can be directly run out of its locker without any previous overhauling, substantially as herein set forth.

3. The within-described arrangement of the bow stoppers and after stoppers, whereby more cable can gradually and controllably be given to a vessel while riding heavily at anchor, substantially as set forth.

4. The clearing-guide, in combination with the annular recess of a capstan or windlass which is capable of working a chain cable when only a partial turn is taken, for the purpose and in the manner substantially as set forth.

In testimony whereof I have hereunto subscribed my name.

THOMAS BROWN.

Witnesses:

W. H. HARFIELD,

CHS. ANNENSEN.